US011310705B2

(12) United States Patent
Liu et al.

(10) Patent No.: US 11,310,705 B2
(45) Date of Patent: Apr. 19, 2022

(54) DOWNLINK DATA COORDINATION BASED LOW OR 0 MS MOBILITY INTERRUPTION

(71) Applicant: QUALCOMM Incorporated, San Diego, CA (US)

(72) Inventors: Huichun Liu, Beijing (CN); Xipeng Zhu, San Diego, CA (US); Gavin Bernard Horn, La Jolla, CA (US); Ruiming Zheng, Beijing (CN); Yu Zhang, Beijing (CN); Chao Wei, Beijing (CN); Ozcan Ozturk, San Diego, CA (US); Jae Ho Ryu, San Diego, CA (US); Jiming Guo, Beijing (CN); Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 16/469,451

(22) PCT Filed: Jan. 26, 2018

(86) PCT No.: PCT/CN2018/074305
§ 371 (c)(1),
(2) Date: Jun. 13, 2019

(87) PCT Pub. No.: WO2018/141230
PCT Pub. Date: Aug. 9, 2018

(65) Prior Publication Data
US 2020/0045596 A1    Feb. 6, 2020

(30) Foreign Application Priority Data

Feb. 2, 2017  (CN) .......................... CN2017-072799

(51) Int. Cl.
*H04W 36/00*    (2009.01)
*H04W 36/08*    (2009.01)
(Continued)

(52) U.S. Cl.
CPC ....... *H04W 36/0072* (2013.01); *H04W 36/08* (2013.01); *H04W 72/042* (2013.01); *H04W 76/27* (2018.02); *H04W 36/0069* (2018.08)

(58) Field of Classification Search
CPC . H04W 36/0072; H04W 76/27; H04W 36/08; H04W 72/042; H04W 36/0069
See application file for complete search history.

(56) References Cited

U.S. PATENT DOCUMENTS 8,885,605 B2    11/2014  Chin et al.
10,595,234 B2 *  3/2020  Xu .......................... H04W 8/26
(Continued)

FOREIGN PATENT DOCUMENTS

CN   101627649 A    1/2010
CN   102238623 A    11/2011
(Continued)

OTHER PUBLICATIONS

International Search Report and Written Opinion—PCT/CN2017/072799—ISA/EPO—dated Nov. 13, 2017.
(Continued)

*Primary Examiner* — Mehmood B. Khan
(74) *Attorney, Agent, or Firm* — Arent Fox, LLP

(57) ABSTRACT

An apparatus for wireless communication, including a memory and at least one processor coupled to the memory. The at least one processor is configured to receive a pre-allocation resource for a target cell via a handover command and transmit a physical layer acknowledgment based on a target cell downlink packet. The at least one processor is also configured to receive an indication for a communication with the target cell in response to the physical layer acknowledgement and access the target cell using the pre-allocated resource based on the indication for the communication with the target cell.

30 Claims, 12 Drawing Sheets

(51) Int. Cl.
H04W 76/27 (2018.01)
H04W 72/04 (2009.01)

(56) References Cited

U.S. PATENT DOCUMENTS

| | | | |
|---|---|---|---|
| 2007/0149206 A1 | 6/2007 | Wang et al. | |
| 2007/0184838 A1* | 8/2007 | Van Der Velde | H04W 36/12 455/436 |
| 2011/0019638 A1 | 1/2011 | Hamel et al. | |
| 2013/0012211 A1 | 1/2013 | Sander et al. | |
| 2014/0153541 A1* | 6/2014 | Backlund | H04W 36/0016 370/331 |
| 2015/0312815 A1* | 10/2015 | Wanstedt | H04W 72/044 455/436 |
| 2016/0192254 A1* | 6/2016 | Hooli | H04W 36/04 370/331 |
| 2017/0135001 A1* | 5/2017 | Kim | H04W 36/0077 |
| 2017/0331577 A1* | 11/2017 | Parkvall | H04W 4/00 |
| 2017/0339726 A1* | 11/2017 | Lin | H04W 48/08 |
| 2018/0184475 A1* | 6/2018 | Babaei | H04W 76/15 |
| 2018/0213452 A1* | 7/2018 | Kim | H04L 5/0053 |
| 2019/0150096 A1* | 5/2019 | Lee | H04W 36/0011 370/331 |
| 2019/0281523 A1* | 9/2019 | Lee | H04W 36/30 |
| 2019/0364546 A1* | 11/2019 | Kwak | H04L 5/0044 |
| 2021/0058838 A1* | 2/2021 | Lee | H04W 36/0058 |

FOREIGN PATENT DOCUMENTS

| | | |
|---|---|---|
| CN | 105992291 A | 10/2016 |
| EP | 2943034 A1 | 11/2015 |
| WO | 2007075559 A2 | 7/2007 |
| WO | 2008023943 A1 | 2/2008 |
| WO | 2008107856 A2 | 9/2008 |
| WO | 2011075181 A1 | 6/2011 |
| WO | 2015050402 A1 | 4/2015 |
| WO | 2016002435 A1 | 1/2016 |

OTHER PUBLICATIONS

International Search Report and Written Opinion—PCT/CN2018/074305—ISA/EPO—dated Apr. 19, 2018.

Intel Corporation: "Mobility Type Support for Multiple Beams in NR", 3GPP Draft, 3GPP TSG RAN WG2 Meeting #ah-18513, R2-1700342, 3rd Generation Partnership Project (3GPP), Mobile Competence Centre, 650, Route Des Lucioles, F-06921 Sophia-Antipolis Cedex, France, vol. RAN WG2, No. Spokane, Wa, Jan. 17, 2017-Jan. 19, 2017, Jan. 7, 2017 (Jan. 7, 2017), XP051203985, 6 pages, Retrieved from the Internet: URL: http://www.3gpp.org/ftp/tsg_ran/WG2_RL2/TSGR2_AHs/2017_01_NR/Docs/. [retrieved on Jan. 7, 2017] the whole document).

Jedrzej S., "Mobility Enhancements to Reduce Service Interruption Time for LTE and 5G", 2016 IEEE Conference on Standards for Communications and Networking (CSCN), IEEE, Oct. 31, 2016 (Oct. 31, 2016), pp. 1-5, XP033026799, DOI: 10.1109/CSCN.2016.7784883 [retrieved on Dec. 15, 2016].

LG Electronics Inc: "The Way to Obtain UL Grant and TA Information for RACH-Less HO", 3GPP Draft, 3GPP TSG-RAN WG2 Meeting #95bis, R2-167108, The Way to Obtain UL Grant and TA Information for RACH-Less HO, 3rd Generation Partnership Project (3GPP), Mobile Competence Centre, 650, Route Des Lucioles, F-06921 Sophia-Ant, vol. RAN WG2, No. Kaohsiung, Taiwan, Oct. 10, 2016-Oct. 14, 2016, Oct. 1, 2016 (Oct. 1, 2016), XP051162441, 3 Pages.

Item 3 Continued: Retrieved from the Internet: URL: http://www.3gpp.org/ftp/tsg_ran/WG2_RL2/TSGR2_95bis/Docs/. [retrieved on Oct. 1, 2016].

Sung N.W., et al., "Fast Intra-Beam Switching Scheme using Common Contention Channels in Millimeter-Wave based Cellular Systems", 18th International Conference on Advanced Communications Technology (ICACT), Global IT Research Institute (GIRI), vol. 5, No. 1, Jan. 2016, pp. 760-765, XP032875584, DOI: 10.1109/ICACT.2016.7423617 [retrieved on Mar. 1, 2016] the whole document.

Supplementary European Search Report—EP18748040—Search Authority—Munich—dated Nov. 17, 2020.

ZTE Corporation: "Analysis on Solutions for Service Interruption Reduction in Mobility Events", 3GPP Draft, 3GPP TSG-RAN WG3 Meeting #91 bis, R3-160621,3rd Generation Partnership Project (3GPP), Mobile Competence Centre, 650, Route Des Lucioles, F-06921 Sophia-Antipolis Cedex, France, vol. RAN WG3, No. Bangalore, India, Apr. 11, 2016-Apr. 15, 2016, Apr. 1, 2016 (Apr. 1, 2016), XP051082833, 6 Pages, Retrieved from the Internet: URL: http://www.3gpp.org/ftp/tsg_ran/WG3_lu/TSGR3_91bis/Docs/. [retrieved on Apr. 1, 2016].

* cited by examiner

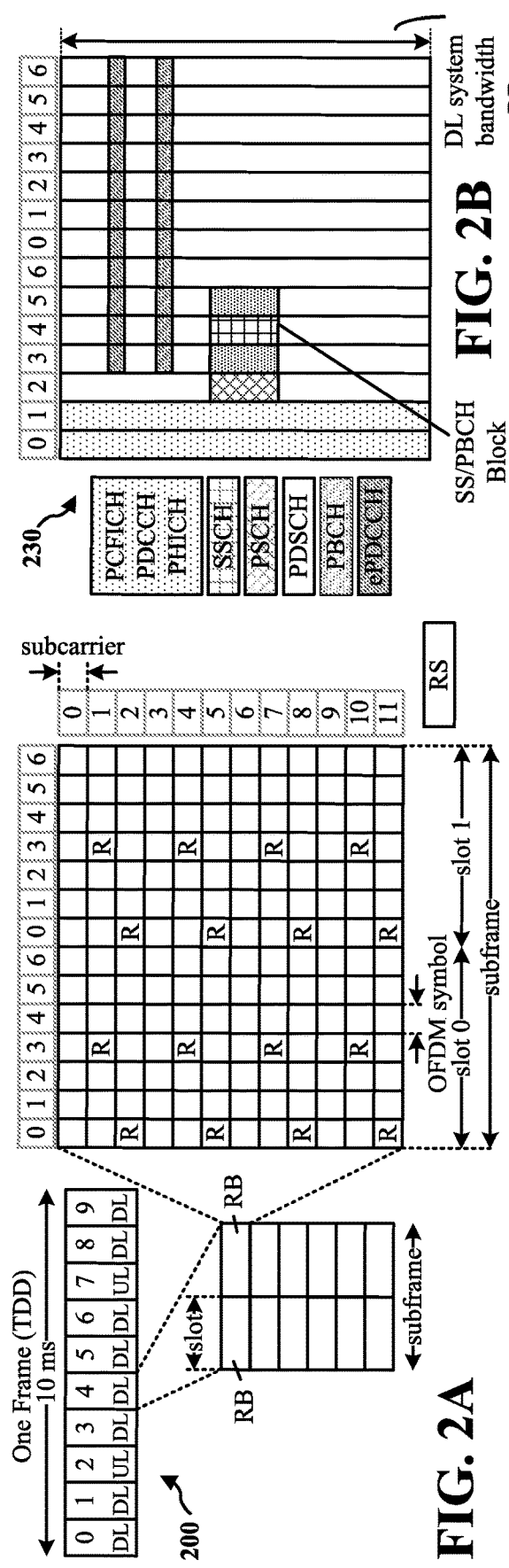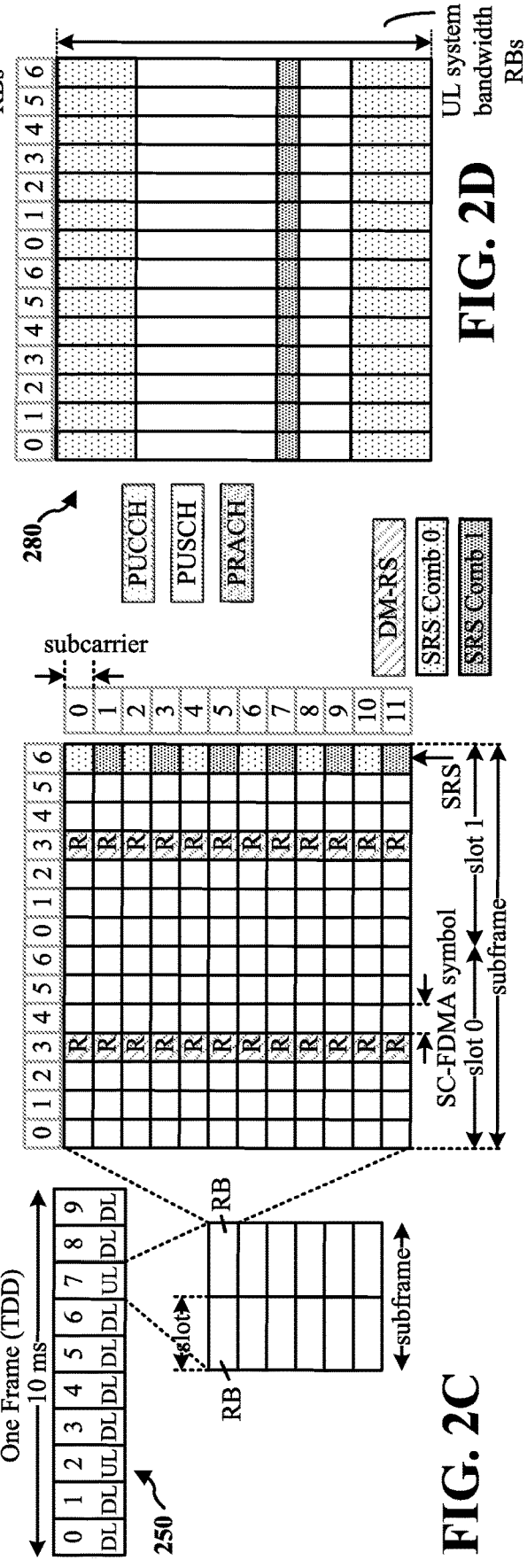

DOWNLINK DATA COORDINATION BASED LOW OR 0 MS MOBILITY INTERRUPTION

CROSS-REFERENCE TO RELATED APPLICATION(S)

This application is a national stage entry of PCT Application No. PCT/CN2018/074305, entitled "DOWNLINK DATA COORDINATION BASED LOW OR 0 MS MOBILITY INTERRUPTION" and filed Jan. 26, 2018, which claims priority to Chinese PCT Application No. PCT/CN2017/072799, entitled "DOWNLINK DATA COORDINATION BASED LOW OR 0 MS MOBILITY INTERRUPTION" and filed on Feb. 2, 2017, both of which are expressly incorporated by reference herein in their entirety.

BACKGROUND

Technical Field

The present disclosure relates generally to communication systems, and more particularly, to communication systems that may have a low mobility interruption time.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method and apparatus are provided. The apparatus is an apparatus for wireless communication. The apparatus for wireless communication includes a memory and at least one processor. The at least one processor is coupled to the memory. Additionally, the at least one processor is configured to receive a pre-allocation resource for a target cell via a handover command. The at least one processor is also configured to transmit a physical layer acknowledgment based on a target cell downlink packet. Additionally, the at least one processor is configured to receive an indication for a communication with the target cell in response to the physical layer acknowledgement. Further, the at least one processor is further configured to access the target cell using the pre-allocated resource based on the indication for the communication with the target cell.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a downlink frame structure, downlink channels within the downlink frame structure, an uplink frame structure, and uplink channels within the uplink frame structure, respectively.

DETAILED DESCRIPTION

Figure 1:
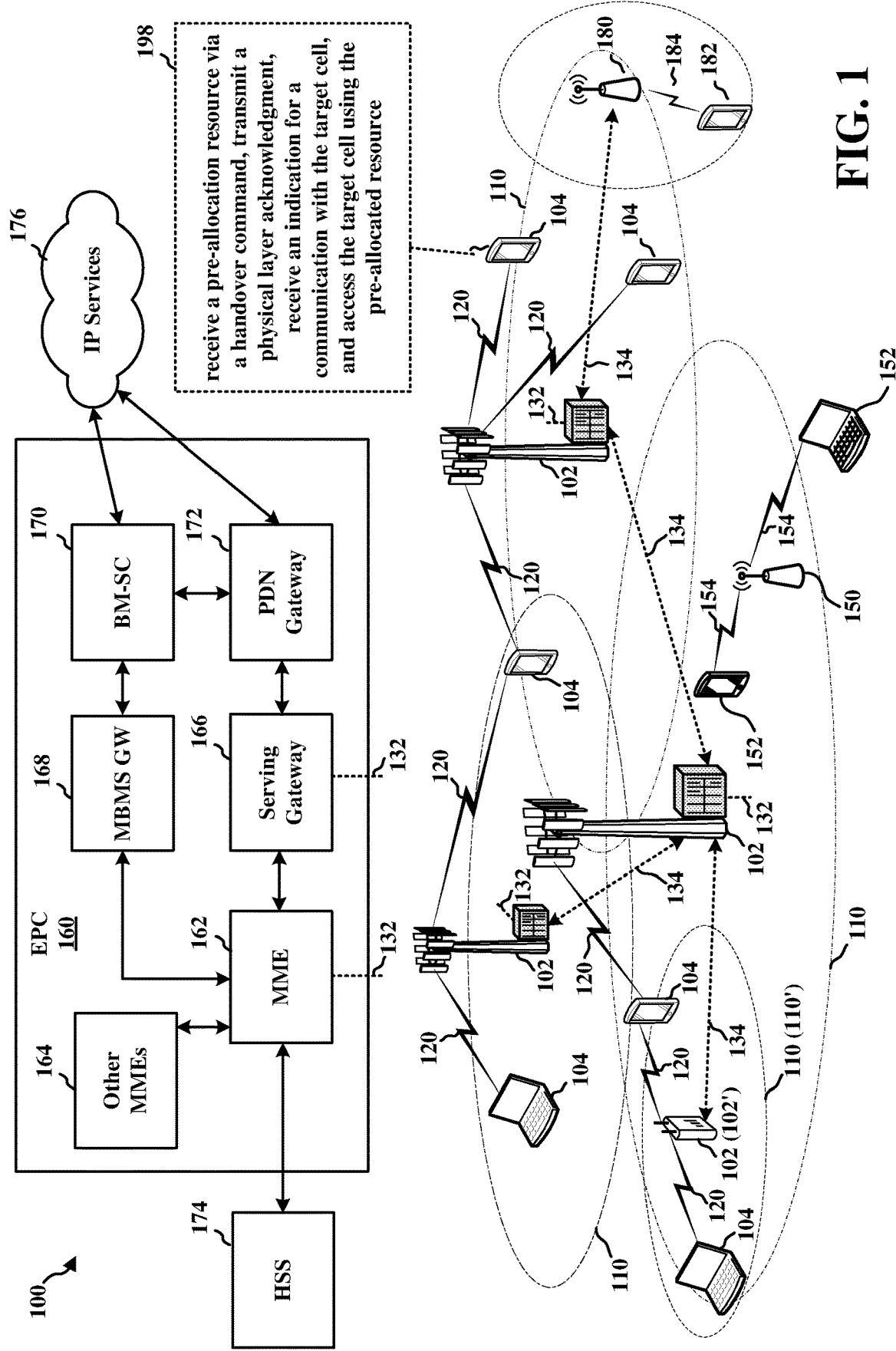
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (e.g., high power cellular base stations) and/or small cells (e.g., low power cellular base stations). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cells and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station (gNB 180) may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information. The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. Referring again to FIG. 1, in certain aspects, the UE 104 may be configured to receive a pre-allocation resource for a target cell via a handover command, transmit a physical layer acknowledgment based on a target cell downlink packet, receive an indication for a communication with the target cell in response to the physical layer acknowledgement, and access the target cell using the pre-allocated resource based on the indication for the communication with the target cell (198). The pre-allocation resource for the target cell may be a resource for communication with the target cell that is allocated for a communication from the UE 104 and the target resource before use.

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^\mu * 15$ kKz, where $\mu$ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 $\mu$s. A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH) which carries a master information block (MIB), may be logically grouped with the PSCH and SSCH to form a synchronization signal (SS)/PBCH The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
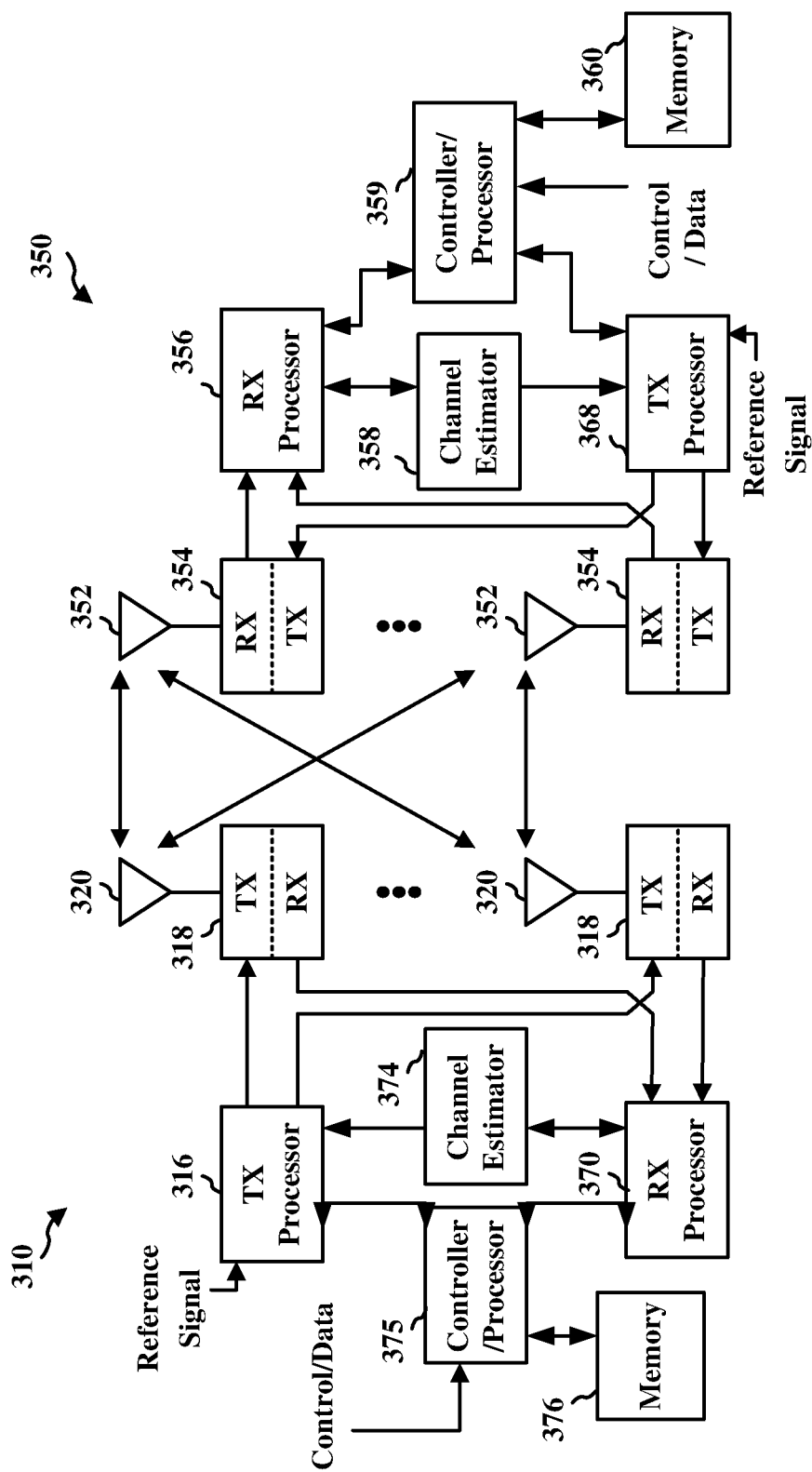
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through the receiver's respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through the receiver's 318RX respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
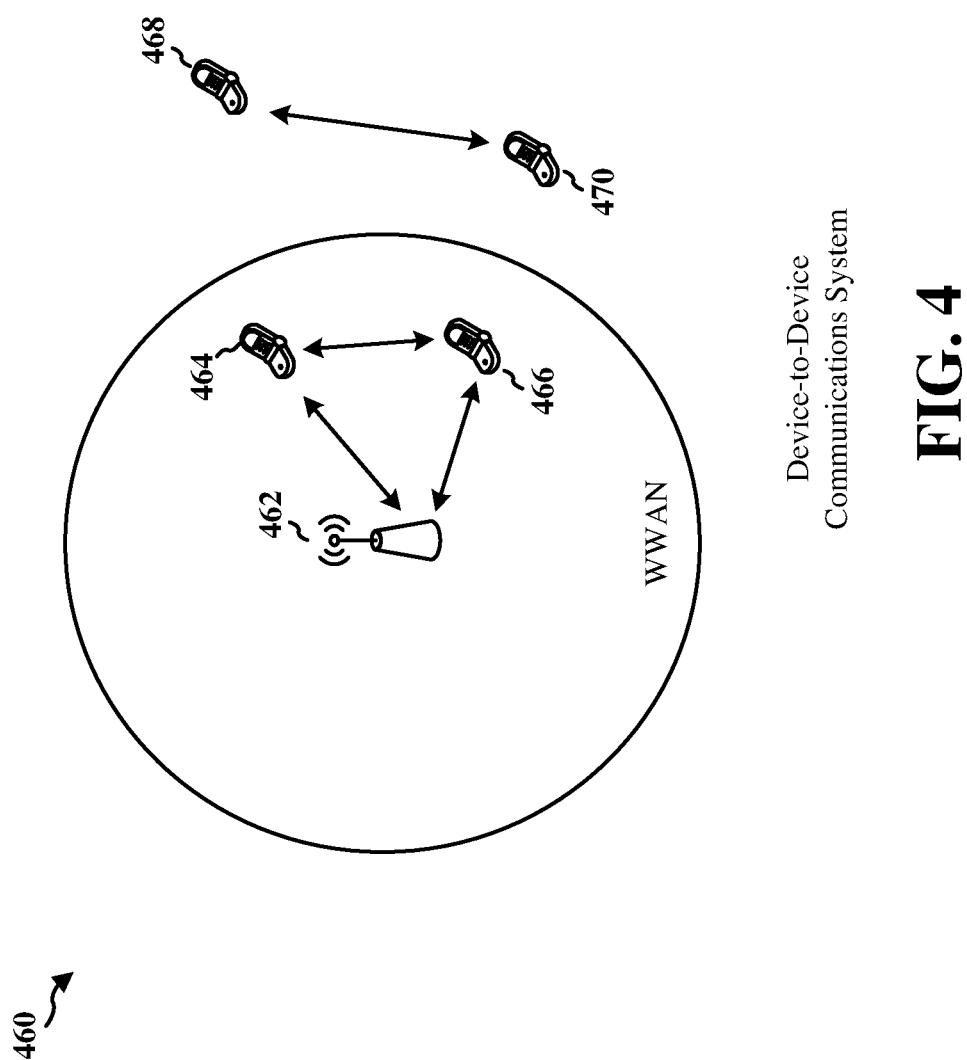
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the downlink/uplink WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Mobility interruption time may be defined as the shortest time duration supported by a system during which a user terminal, e.g., a UE, is unable to exchange user plane packets with any base station, e.g., a gNB, during a transition from one base station to another base station.

Some applications may be delay sensitive. Examples of delay sensitive applications may include remote control vehicles or remote driving vehicles. Other examples of delay sensitive applications may include augmented reality applications, e.g., in smart glasses, other specific machine communications requiring low latency, or other time sensitive communications.

The 3rd Generation Partnership Project (3GPP) is a collaboration between groups of telecommunications associations. 3GPP has promulgated lists of performance indexes for fifth generation mobile networks (5G). Mobility interruption time reduction is one performance index for 5G. Mobility interruption time reduction may be required to support delay sensitive applications. The target for mobility interruption time may be zero milliseconds. Some embodiments described herein may decrease mobility interruption time relative to the mobility interruption time of pre-5G communications systems. For example, some embodiments described herein may decrease mobility interruption time to zero milliseconds or something close to zero.

Some proposed solutions for decreasing mobility interruption time are based on UE capability enhancements. The UE capability enhancements may enable simultaneous intra-frequency target base station 102b (e.g., target cell) PUSCH transmission. Simultaneous intra-frequency target base station 102b PUSCH transmission may be used to send a handover complete message to a target. The UE capability enhancements may also enable source base station 102a downlink PDCCH packet reception for downlink data non-interruption (e.g., a lack of a mobility interruption) and/or PDSCH packet reception for downlink data non-interruption. The proposed solutions, however, may require changes in UE capability and, accordingly, may not be cost effective and/or backward compatible.

Some aspects herein for decreasing mobility interruption time relate to a downlink data coordination procedure by which a network may receive an indication that a UE is synchronized to a target cell (e.g., to a target base station 102b in the target cell) and the UE is ready to transmit to or receive from the target base station 102b directly without performing a Random Access Chanel (RACH) procedure at the target base station 102b. A downlink data coordination procedure that does not perform the RACH procedure at the target base station 102b may avoid the increased UE capability requirements of the other proposed solutions discussed above. Some aspects proposed herein may provide a more complete solution. In other words, some examples proposed herein may achieve zero millisecond mobility interruption during handover. Additionally, aspects may be associated with an intra-frequency handover.

Figure 5:
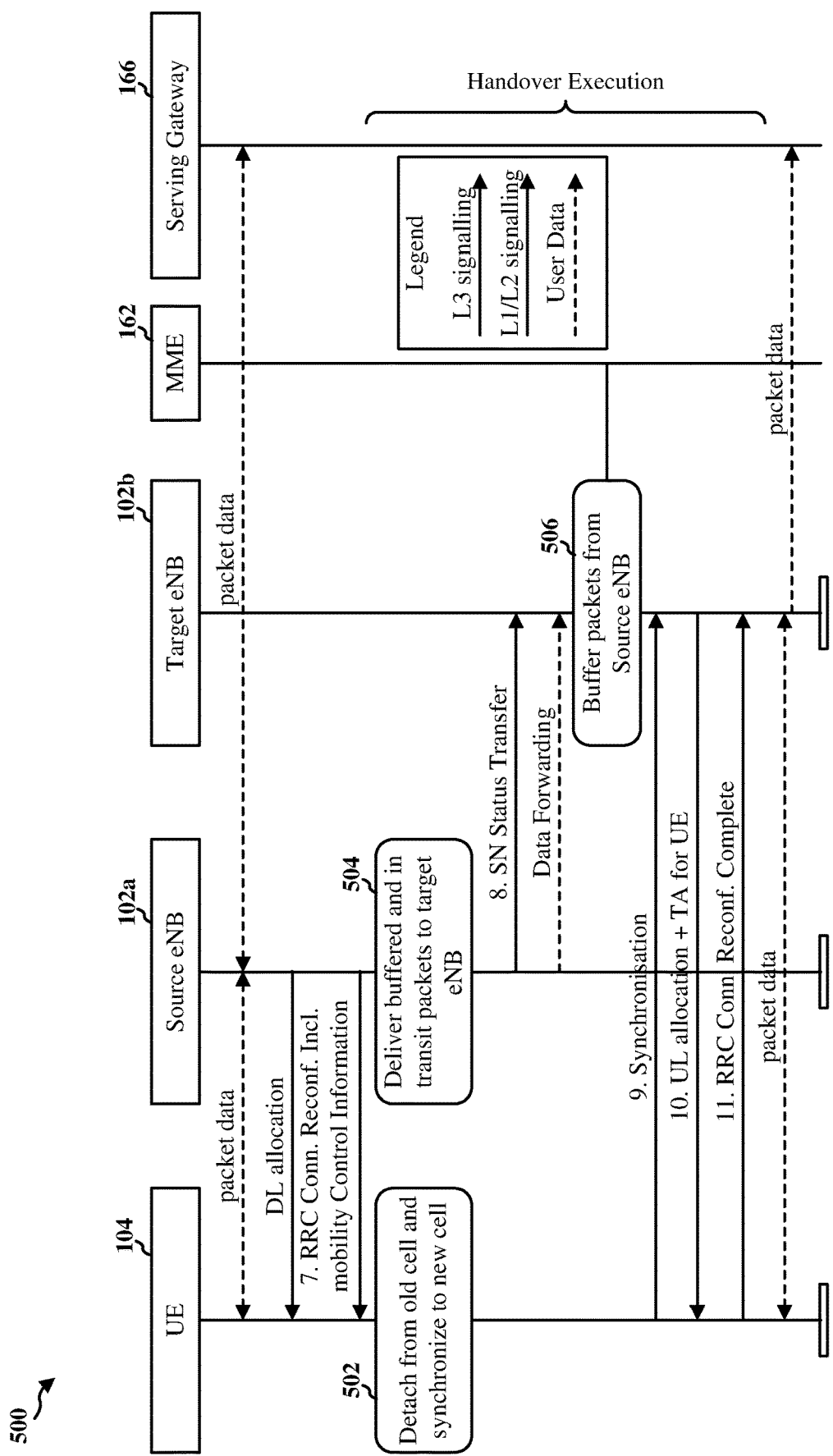
FIG. 5 is a diagram illustrating a handover signaling procedure.
Figure 6:
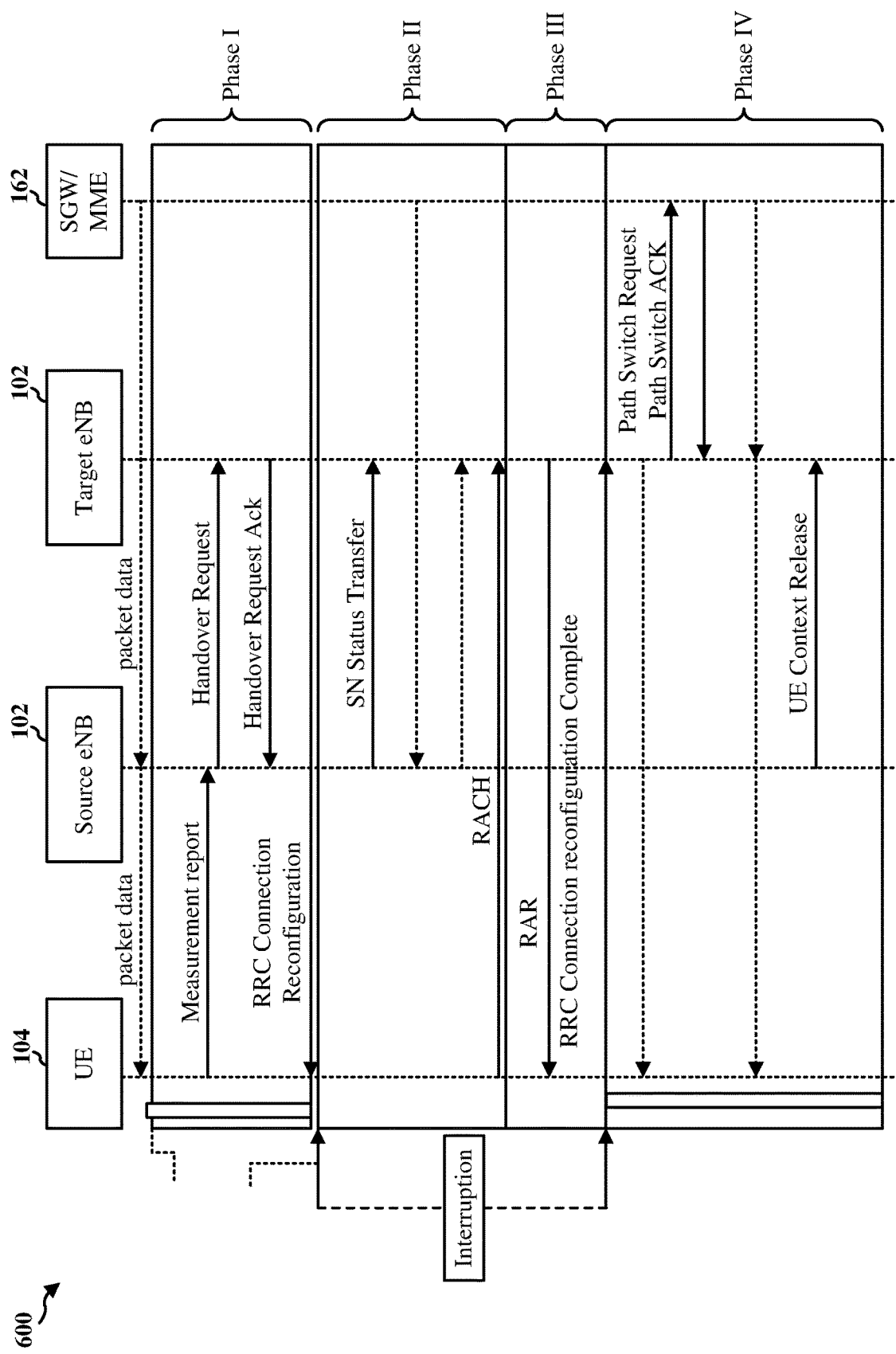
FIG. 6 is a diagram 600 illustrating four phases in a handover of the UE from the source base station to the target base station.

An example of a handover is discussed with respect to FIGS. 5 and 6. The example handover may be a fourth generation mobile network (4G) handover procedure. In a 4G network, a mobility interruption may lead to a break down in data communication for delay sensitive applications. For example, mobility interruptions in 4G may, in some cases be too long for one or more of the delay sensitive applications discussed above (or other delay sensitive applications).

FIG. 5 is a diagram illustrating a handover signaling procedure 500. The diagram illustrates signaling between the UE 104, the source base station 102a, the target base station 102b, the MME 162, and the serving gateway 166. As illustrated in the diagram, when the UE 104 and the source base station 102a are in communication, e.g., prior to a handover, packet data may be transmitted and received between the UE 104 and the source base station 102a. Packet data may also be transmitted and received between the source base station 102a and the serving gateway 166. The packet data may be, for example, user data from or to the UE.

A downlink allocation may be transmitted from the source base station to the UE 104. The downlink allocation may be via level 1 or level 2 signaling, e.g., signaling data link level (level 1) or signaling link level (level 2). The downlink allocation may be a downlink resource allocation, such as an indication of a handover to a another base station, e.g., the target base station 102b. Additionally, at 7, the source base station 102a may transmit a RRC connection reconfiguration message that includes mobility control information. The RRC connection reconfiguration message may be transmitted using level 3 signaling, e.g., signaling at the network level. Additionally, the RRC connection reconfiguration message may include information related to the handover to the new base station, e.g., the target base station 102b. Accordingly, the UE 104 may detach from the old cell (e.g., source base station 102a) and synchronize to the new cell (e.g., target base station 102b) at 502. Additionally, the source base station 102a may deliver buffered and in-transit packets to the target base station 102b at 504.

At 8, the source base station 102a may transmit a serial number (SN) status transfer message to the target base station 102b. The SN status transfer message may be used to transfer received status information of the uplink data sent by the UE 104 as part of the handover. The SN status transfer message may be sent using level 3 signaling. Data, e.g., user data, may also be forwarded from the source base station 102a to the target base station 102b. The target base station 102b may buffer packets from the source base station 102a at 506.

At 9, the UE 104 may synchronize to the target base station 102b. Synchronization of the UE 104 with the target base station 102b may be performed using level 1 or level 2 signaling. For example, timing information may be transmitted between the UE 104 and the base station 102b over level 1 or level 2 so that the timing of the UE 104 may be synchronized with the timing at the base station 102. At 10, e.g., in a non-intra-frequency handover, the target base station 102b may allocate an uplink frequency for use to send data from the UE 104 to the target and a timing advance (TA) for the UE 104. (In an intra-frequency handover the frequency may be unchanged.) The TA may be used to make timing adjustments between the UE 104 and the target base station 102b. For example, because different UEs 104 in a cell may be located at different locations, the UEs 104 may need to initiate transmissions at different times in order for the UEs 104 transmissions to arrive at a base station 102 at the same time. The TA may be used for the timing adjustments. The target base station 102b uplink allocation and the TA for the UE 104 may be transmitted over level 1 or level 2 signaling.

At 11, the UE 104 may send a RRC connection reconfiguration complete message indicating that the handover is complete. The UE 104 is in the cell of the target base station 102b, e.g., in a connected mode with the target base station 102b. In other words, the target base station 102b is now the serving cell of the UE 104. The RRC connection reconfiguration complete message may be sent using level 3 signaling. After the UE 104 sends a RRC connection reconfiguration complete message indicating that the handover is complete, packet data, e.g., user data, may be sent and received between the UE 104, the target base station 102b (now the new source base station of the new serving cell), and the serving gateway 166. As illustrated in the diagram, when the UE 104 and the target base station 102b are in communication, e.g., after a handover, packet data may be transmitted and received between the UE 104 and the target base station 102b. Packet data may also be transmitted and received between the target base station 102b and the serving gateway 166.

FIG. 6 is a diagram 600 illustrating four phases (e.g., Phase I, Phase II, Phase III, and Phase IV) in a handover of the UE 104 from the source base station 102a to the target base station 102b. The handover procedure discussed with respect to FIG. 5 may be divided into four phases. In Phase I, the UE 104 may send a measurement report to the source base station 102a. The UE 104 may send the measurement report to the source base station 102a before the UE 104 receives a handover command, e.g., a RRC connection reconfiguration message from the source base station 102a. The source base station 102a may transmit a handover request to the target base station 102b and receive a handover request acknowledge from the target base station 102b before transmitting the handover command, e.g., the RRC connection reconfiguration message, to the UE 104.

In Phase II, e.g., from the end of Phase I to when the UE 104 performs a RACH procedure with the target base station 102b, the source base station 102a may send the SN status transfer to the target base station 102b.

In Phase III, e.g., from the end of Phase II to when the UE 104 sends the RRC reconfiguration complete message to target base station 102b, the target base station 102b sends a random access response (RAR) to the UE 104. The UE 104 may then send the RRC reconfiguration complete message to the target base station 102b.

In Phase IV, e.g., after the RRC reconfiguration complete message, a path switch request path switch acknowledge may be transmitted by the target base station 102b to the MME 162. Additionally, a UE context release message may be transmitted from the source base station 102a to the target base station 102b.

The four phases illustrated in FIG. 6 may be used in conjunction with a 4G system as part of a handover from one base station 102 (e.g., the source base station 102a) to another base station (e.g., the target base station 102b). As discussed above, mobility interruption time may be defined as the shortest time duration supported by a system during which a user terminal, e.g., a UE, is unable to exchange user plane packets with any base station, e.g., a base station, during a transition from one base station to another base station. As illustrated in FIG. 6, the mobility interruption happens in Phase II and Phase III. Table 1 (below) may be referred to for mobility interruption analysis. Table 1 lists example delays for various operations in the example handover illustrated in FIGS. 5-6.

TABLE 1

Typical radio access latency components during handover

| Component/Step | Description | Time (ms) |
| --- | --- | --- |
| 7 | RRC Connection Reconfiguration Incl. mobilityControlInfo | 15 |
| 8 | SN Status Transfer | 0 |
| 9.1 | Target cell search | 0 |
| 9.2 | UE processing time for RF/baseband re-tuning, security update | 20 |
| 9.3 | Delay to acquire first available PRACH in target eNB (gNB, base station) | 0.5/2.5 |
| 9.4 | PRACH preamble transmission | 1 |
| 10 | UL Allocation + TA for UE | 3/5 |
| 11 | UE sends RRC Connection Reconfiguration Complete | 6 |
| | Minimum/Typical Total delay [ms] | 45.5/49.5 |

The mobility interruption components may be grouped into four parts. Mobility interruption part 1 is handover message handling. Handover message handling may introduce a mobility interruption of 15 ms in the illustrated example of handover described herein. The handover message handling is also referred to as 7. The handover message handling includes the RRC procedure delay. The RRC procedure delay includes RRC connection reconfiguration and mobility control information as well as related reconfiguration information, such as information related to changing from one base station 102a to another base station 102b. The RRC procedure delay may also include resetting the MAC layer, reconfiguring the PDCP, reconfiguring the RLC layer, and reconfiguring L3.

Mobility interruption part 2 is target base station 102b synchronization. The target base station 102b synchronization in the illustrated example may introduce a mobility interruption of 20 ms. The target base station 102b synchronization includes a mobility interruption time based on delays introduced by 9.1 and at 9.2. Accordingly, the target base station 102b synchronization related mobility interruption includes time for a target base station 102b search, a UE processing time for RF/baseband retuning, time for a derive target base station specific keys, and a configure security algorithm related interruption time, The configuration security algorithm may be used in a target base station 102b and may increase the mobility interruption time. The target base station 102b synchronization related mobility interruption includes the RACH procedure. The RACH procedure may include an uncertainty delay to acquire a RACH opportunity followed by a PRACH preamble transmission.

The mobility interruption part 3 may include a PRACH procedure. In the illustrated example, the mobility interruption part 3 has a mobility interruption time that is 8.5 ms. The mobility interruption time includes at 9.3, a delay of 2.5 ms to acquire first available PRACH, at 9.4, a delay of 1 ms for a PRACH Transmission, and at 10 a delay of 5 ms for an uplink Allocation+TA for UE.

The mobility interruption part 4 may include transmission of a RRC reconfigure complete message. The mobility interruption time due to the RRC configuration is 6 ms. The mobility interruption time for part 4 in the illustrated example includes at 11 a UE 104 sending a RRC connection reconfiguration message. The mobility interruption time for a UE 104 sending the RRC connection reconfiguration message in the illustrated example is 6 ms.

The examples described herein include techniques for mobility interruption reduction in each part, e.g., parts 1, 2, 3, and 4. The examples for parts 1, 2, 3, or 4 may be used alone or in combination. Furthermore, in some examples, subsets of one or more of the proposals for each part, e.g., parts 1, 2, 3, or 4, may be used to reduce a mobility interruption.

In an example for mobility interruption reduction for part 1, e.g., handover message handling in 7, the mobility interruption may include UE 104 RRC procedure delay. For example, in part 1, the UE 104 receives the RRC connection reconfiguration message. The RRC connection reconfiguration message may include parameters for a handover (HO). The UE 104 may be commanded by the source base station 102a to perform the handover (HO). The part 1 mobility interruption reduction may be from both the network side, e.g., the base stations 102, and the UE 104 side.

Figure 7:
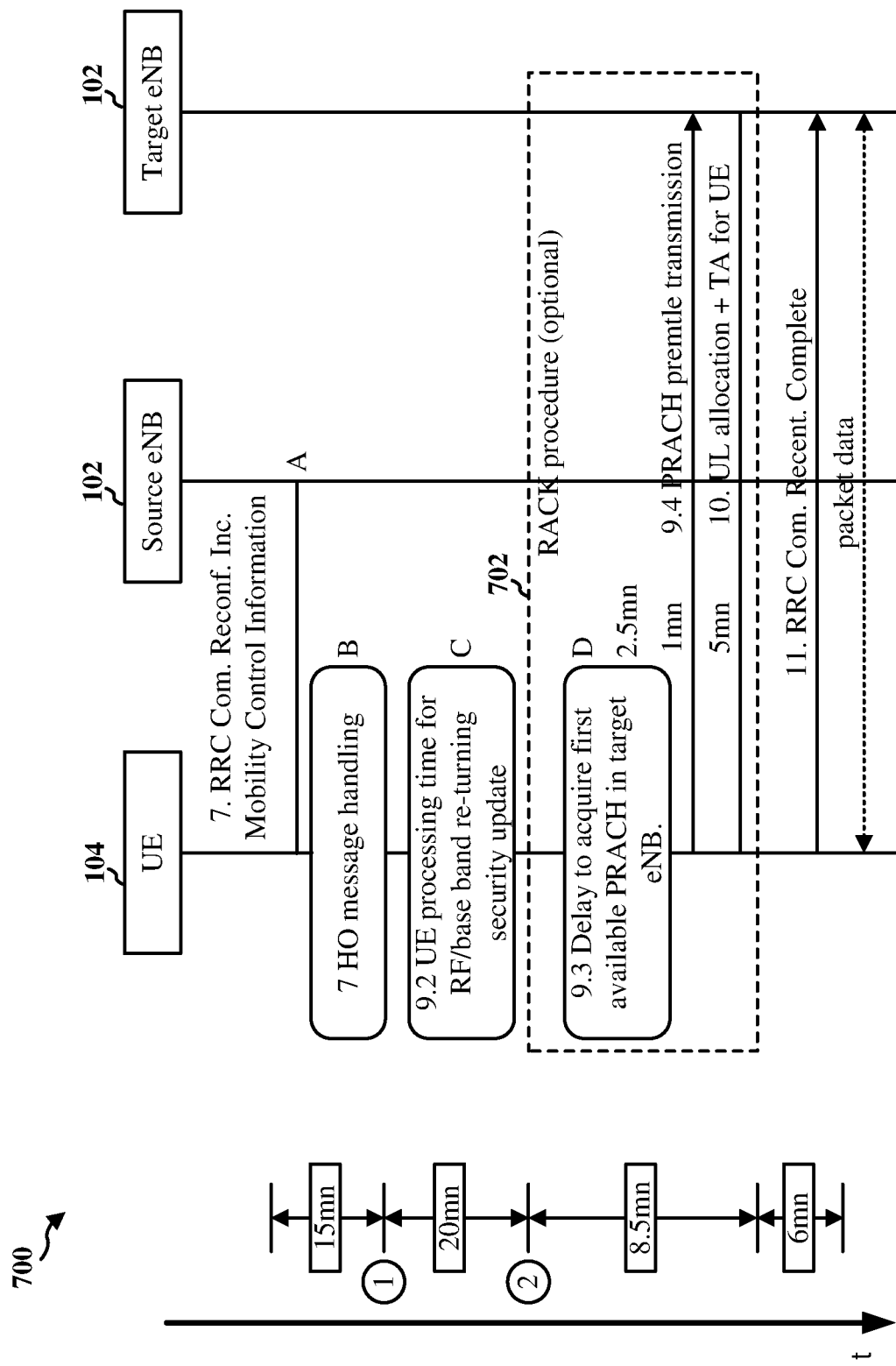
FIG. 7 is a signaling diagram.

FIG. 7 is a signaling diagram 700 related to packet bi-casting. Bi-casting is transmitting to both a source base station 102a and a target base station 102b. Bi-casting may be used in conjunction with other aspects described herein to decrease mobility interruption time. In an example, the network side may bi-cast a received packet and an enhanced Packet Data Convergence Protocol (PDCP) SN update. With packet bi-casting, a source new radio access network (RAN), e.g., within a coverage area 110, node X2 communication link (or S1 interfaces) may start to transmit downlink packets to both the source base station 102a and the target base station. Transmitting DL packets to both the source base station 102a and the target base station 102b differs from other handover data forwarding, which only forwards a received packet to the target base station 102b with no copy of the received packet retained at the source base station 102a. Packet bi-casting may be defined as not only sending a copy of a received packet to the target base station 102b, e.g., a base station in a coverage area 110, but also storing the packet or continuing to store the packet at the source base station 102a, e.g., after transmission is complete. For example, the UE 104, a RAN node, or both may bi-cast to both the base station 102*a* and the base station 102*b*. In some examples, data transmissions, e.g., from the RAN, may continue for a while after the RRC connection reconfiguration including mobility control is sent to the UE 104. In some examples, receiving in the source RAN node may also continue for a while after the RRC connection reconfiguration including mobility control is sent to the UE 104.

An example device may receive a pre-allocation resource for a target cell via a handover command and determine a handover message handling period. The device may also bi-cast downlink date to a source base station and a target base station during the handover message handling period.

FIG. 7 graphically illustrates four options for the timing of packet bi-casting, option A, option B, option C, and Option D. With option A, a device, e.g., the source base station 102*a*, may start packet bi-casting immediately after sending a handover command to UE 104. As illustrated in FIG. 7, by the letter "A," packet bi-casting starts immediately after sending the handover command, e.g., the RRC connection reconfiguration message including mobility control information, to UE 104.

With option B, a device, e.g., the source base station 102*a*, may start packet bi-casting within the time duration when the UE 104 is processing the handover (HO) message. For example, as illustrated in FIG. 7, by the letter "B," the source base station 102*a* starts packet bi-casting within the time duration when the UE 104 is processing the handover (HO) message.

With option C, a device, e.g., the source base station 102*a*, may start packet bi-casting within the time duration when the UE 104 is RF baseband re-tuning to the target base station frequency, e.g., at 9.2. The RF-retuning procedure may be skipped when the network is synchronized and the UE 104 is in an intra-frequency handover. For example, as illustrated in FIG. 7, by the letter "C," the source base station 102*a*, starts packet bi-casting within the time duration when the UE 104 is RF baseband re-tuning to the target base station frequency. When the network is synchronized and the UE 104 is in an intra-frequency handover the packet bi-casting may be started in advance (e.g., option B, C). For example, the RF-retuning procedure may be skipped for an intra-frequency handover (HO).

With option D, a device, e.g., the source base station 102*a*, may start data bi-casting within the time duration when the UE 104 is performing a RACH procedure 702. For example, as illustrated in FIG. 7, by the letter "D," the source base station 102*a* may start data bi-casting within a time duration that may be needed by the UE 104 to perform the RACH procedure 702. The RACH procedure is highlighted by the dashed line rectangle. The RACH procedure 702 is optional in some cases. When the RACH procedure 702 is used, however, the packet bi-casting may need to be started in advance (e.g., options A, B, C).

The timing of bi-casting may be determined based on a consideration of a series of factors. The time to start packet bi-casting should not be too early or too late, e.g., with respect to a particular handover (HO), as defined by a consideration of the factors described herein, as well as other factors known to a person of skill in the art. The earlier the data packet bi-casting to a target, e.g., the base station 102*b*, starts, the more data the target node may have to buffer. Conversely, the later the packet bi-casting begins, the greater the risk that a source node, e.g., a source base station 102*a*, signal may degrade before the UE 104 receives the packet. When a source node, base station 102*a*, signal degrades before the UE 104 receives the packet, the packet may not be receivable by the UE 104, and packet loss may occur.

The time to start packet bi-casting may consider the following factors, (1) target node buffer requirements (e.g., large buffer size, medium buffer size, or low buffer size), (2) the Xn backhaul (a backhaul communication link)(ideal or non-ideal backhaul) (whether the UE 104 needs to downlink synchronize to the target may determine whether 9.2 is needed or not), (3) whether RACH procedure 702 is needed or not (at 9.3~10), and/or (4) the UE 104 capability (simultaneous or concurrent Rx/Tx with target and Rx/TX with source). Various different implementations may select different timing of packet bi-casting after consideration the above parameters.

Some aspects may perform a PDCP SN Update. A SN status transfer procedure may also be enhanced to support the mobility interruption reduction. In 4G, the source base station 102*a* stops downlink data transmission and downlink PDCP SN allocation when the source base station 102*a* sends a RRC handover command to the UE 104.

The source base station 102*a* sends a SN status Transfer to a target base station 102*b* after the source base station 102*a* stops downlink PDCP SN allocation. The SN status transfer may indicate the PDCP SN to allocate to packets that do not have a PDCP SN. The source base station 102*a* may also indicate hyper frame number (HFN) values for both an uplink and a downlink. The parameter in the SN status transfer may be input to the target base station 102*b* for downlink and uplink data encryption and decryption in the target base station 102*b*.

In an aspect, to achieve low or zero millisecond mobility interruption during handover, the source node base station 102 may continue packet reception and packet transmission and downlink PDCP SN allocation after the source node base station 102 sends the handover command to the UE 104. Accordingly, the SN status transfer does not use the PDCP SN to allocate packets. The base station 102 may already have allocated resources for the forwarded PDCP.

For a downlink PDCP SN update, when a target base station 102 starts a downlink transmission, the target base station 102*b* may update the "real" downlink PDCP SN according to the downlink PDCP SN and the Hyper-Frame Number (HFN) in the SN Status transfer message and the downlink packet count. For an uplink PDCP SN update, when the UE 104 starts to access a target base station 102*b*, e.g., starts a connection procedure to the base station 102, the update uplink SN may be reported from the source base station 102*a* to the target base station 102*b* via Xn backhaul, as discussed with respect to the downlink data coordination procedure. When the UE 104 accesses a target base station 102*b*, duplicate downlink PDCPs status reports may have already been received by the UE 104 from the source base station 102*a*. According to a UE PDCP status report, when the UE 104 accesses the target node base station 102, the target node base station 102 may remove the duplicated packets, for example, the target base station 102*b* may remove the duplicates based on a status report that include which packets have been received by the UE 104 such that the target base station 102*b* removes the duplicates from the transmit buffer. In an example, the target base station 102*b* may otherwise not send the duplicates to the UE 104.

Figure 8:
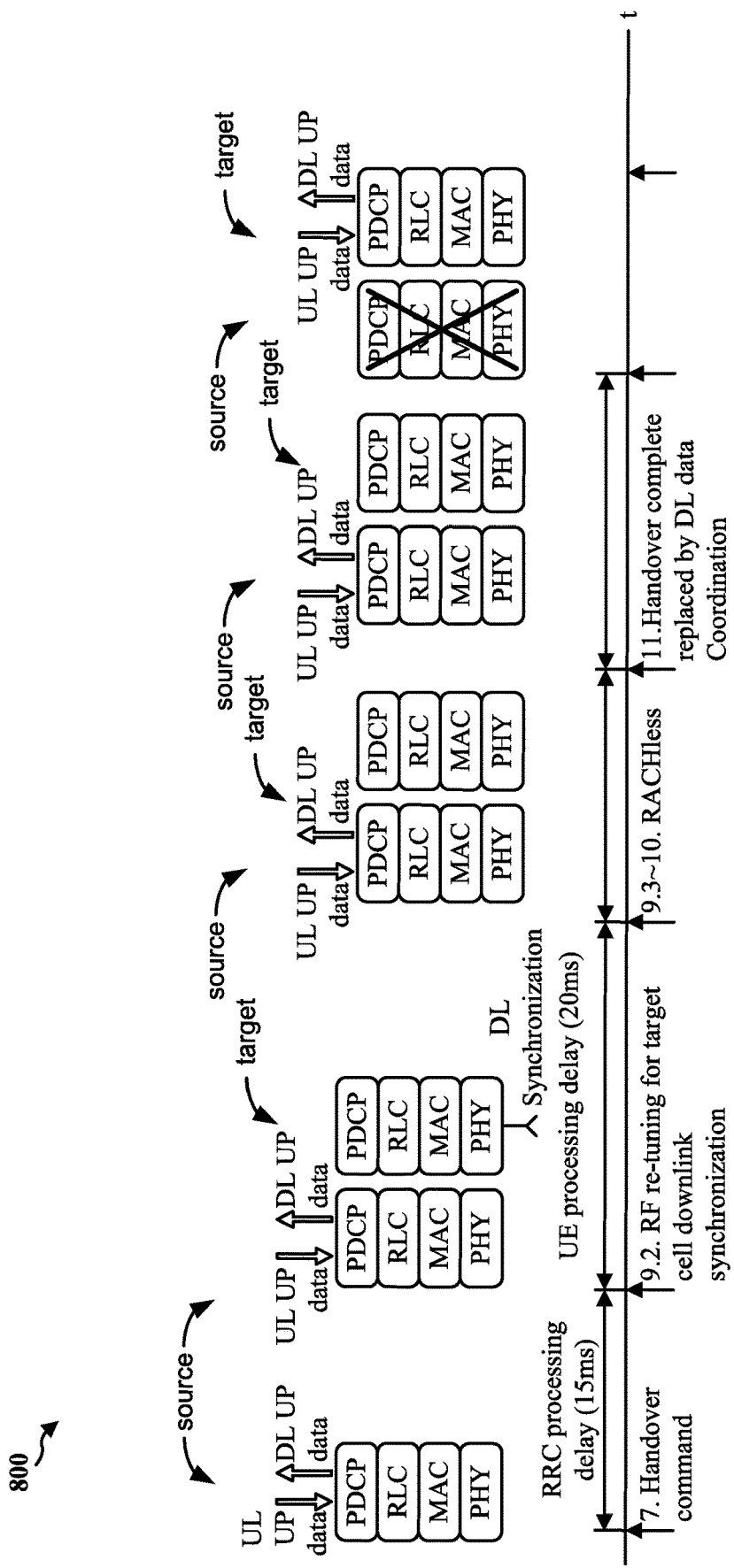
FIG. 8 is a diagram illustrating a UE dual stack during handover.

FIG. 8 is a diagram 800 illustrating a UE 104 with a dual stack that may be used to a decrease mobility interruption time during handover. In 4G, for example, the UE 104 stops transmitting and receiving packets after a handover command is received. To achieve a lower or zero millisecond mobility interruption during handover, the UE 104 may maintain transmission and reception of packets from the source base station 102a after the source base station 102a receives a handover command (at 7), e.g., the UE 104 may maintain a temporary dual stack, such as a TCP/IP protocol dual stack, one stack for the source base station 102a and one stack for the target base station 102b.

At 7, when the UE 104 receives a handover command from the source base station 102a, the UE 104 may not stop downlink packet reception and uplink packet transmission via a source protocol stack associated with the source base station 102a while preparing the layer 3 and layer 2 protocol configuration for the target base station. At 9.2, the UE 104 may need to re-tune the UE's 104 RF chain for target base station 102b downlink synchronization. During the re-tuning and synchronization time, the uplink packet transmission from the UE 104 to the target base station 102b may also be transmitted using the source protocol stack and the downlink transmission from the target base station 102b to the UE 104 may be received in the source protocol stack. Accordingly, continuous packet transmissions may occur. The RACH, starting at 9.3 and ending during 10, may be skipped in aspects that do not need the RACH, as described herein.

In 4G, at 11 the UE 104 may send handover complete packets to the target base station 102b. The handover complete packets may be packets that indicate that a handover is completed. Using the downlink data coordination method described herein, 11 may be skipped by a target base station 102b. The target base station 102b may obtain an indication that the UE 104 is ready to access the target base station's 102b downlink and uplink directly, e.g., the UE 104 may communicate directly with the target base station 102b, without sending a handover complete to the target base station 102b. In some systems, on receipt of the handover complete packets at the source base station 102a from the UE 104, a gateway may send one, or more, dummy packets. The source base station 102a may forward the dummy packets to the target base station 102b. The target base station 102b may then start sending fresh data when the base station 102b receives the dummy packets from the source base station 102a. The handover complete packets may not need to be sent in each aspect. For example, when packets are simultaneously sent from both the source base station 102a and the target base station 102b a handover complete packet may not be needed. The handover complete packet may not be needed because the handover may be completed by source base station 102a and then source base station 102 may discontinuing the sending of packets to the UE 104. When the source base station 102a discontinues sending packets to the UE 104, the target base station 102b may already be sending packets to the UE 104. Duplicate packet sending may allow for overlap between the transmissions until the handover is known to be complete at the base station 102a.

In the downlink data coordination procedure, the downlink data may be jointly scheduled, for example, by the base station 102a and the base station 102b. The source base station 102a and the target base station 102b may simultaneously transmit a downlink data transmission. The downlink data transmission by the source base station 102a and/or target base station 102b may be transparent to the UE 104. The UE 104 may use the source base station 102a protocol stack to receive downlink data and transmit uplink data. The UE 104 may receive both target and source packets using the source stack. For example, both target and source packets may be stored to the source stack and retrieved from the source stack. In an aspect, a memory may be used to store data received as part of a target packet. The memory may also be used to store data received as part of a source packet. The data stored in the memory (e.f., data received as part of a target packet and/or data received as part of a source packet) may be read from memory when the data later needs to be received.

After the UE 104 is ready to access a target base station control channel (the control channel may be determined by the target base station 102b according to an uplinkACK of a pre-configured PUCCH of target base station 102b or by an action time which is received by the UE 104 from the source MAC CE), the UE 104 may access the target base station 102b downlink and uplink using the target base station protocol stack. For example, the UE 104 may prepare the target base station protocol stack according to a handover command configuration while continuing UL/DL data transmission with the source base station.

The UE 104 may need to downlink synchronize with the target base station 102b before the UE 104 may access the target base station 102b. Additionally, the UE 104 may need to read the target base station 102b PSS and SSS. In another example, in order to achieve a lower or zero mobility interruption during a handover, the UE 104 may have an enhanced capability of simultaneous Rx from two intra-frequency cells (target cell: receive PSS/SSS/CRS and source cell: receive PDCCH/PDSCH) and transmission to source base station 102a PUCCH/PUSCH. The UE 104 enhanced capability may be defined as the UE 104 supporting simultaneous Rx from two intra-frequency cells (receive PSS/SSS/CRS from target base station and receive PDCCH/PDSCH from source base station) while transmitting to source base station 102a PUCCH/PUSCH, e.g., while transmitting PUCCH/PUSCH to the source base station 102a.

In, for example, in a 4G handover procedure, the UE 104 may perform a RACH procedure with a target base station 102b after a target base station 102b downlink synchronization. In the RACH procedure, the UE 104 may acquire target base station 102b uplink time alignment, perform power ramping, and obtain an uplink grant to transmit the RRC reconfiguration complete message to the target base station 102b. After transmitting the RRC reconfiguration complete message to the target base station 102b, the target base station 102b knows the UE 104 is ready to receive downlink transmissions from the target base station 102b and transmit uplink transmissions to the target base station 102b.

As discussed above, however, the RACH procedure may be avoided at least in some aspects without introducing any new time alignment control or estimation mechanism. The RACH procedure may be avoided because the network knows when the timing alignment is the same for both the source base station 102a and the target base station 102b, for example, during a small cell handover. In a small cell handover, "RACH-less" operation may be enabled by setting the timing advance to zero, TA=0. TA is a time offset for various UEs. The TA may be used to cause an offset of timing in a UE, e.g., UE 104. In other words, the TA may change the timing of events at the UE 104 so that transmissions to a base station 102 may arrive at the base station 102 at an appropriate time based on timing at that base station 102. Different TA values may be used based on distance of the UE 104 from a base station 102. In a small cell handover, TA may be set to zero because the distances from a UE 104 or UEs 104 and a base station may be small. Furthermore, the TA may be 0 because in a small cell handover (HO) the distance from the UE 104 to the source base station 102a and to the target base station 102b is about the same hence timing alignment is the same. In another example, for an intra-base station handover (e.g., when a network transmission site is collocated), the RACH-less operation reusing the current TA value may be applicable. The same, e.g., non-zero TA value, may be used for collocated base stations 102 because the distance from the base stations 102 to the UE 104 will generally be the same or nearly equal.

In an aspect, for general handover scenarios which are neither a small cell handover nor an intra-base station handover, the target base station 102b TA may be acquired without the RACH procedure through a UE 104 based method or network based method. For example, for a UE-based TA calculation, a new Uplink TA of the target base station 102b may be formulated as:

$$N_{TA,new} = N_{TA,old} + N_{TA,UE}$$

where TA is the Time Alignment, $N_{TA,UE}$ is a downlink subframe boundary difference between the source base station 102a and the target base station 102b, depending on the particular UE implementation and where $N_{TA,UE}$ is based on the old base station time alignment ($N_{TA,old}$) and the TA difference between source base station and target base station.

In an example, the TA value of ($N_{TA,UE}$) may be calculated by the UE 104 based on the downlink subframe boundary difference between the source base station 102a and the target base station 102b. For example, a same downlink subframe boundary at the source base station 102a and the target base station 102b may be used and the offset in the boundary may be the offset. In another example, the TA value may be up to the UE implementation.

For the network based TA calculation, a target base station 102b may measure a UE 104 uplink signal at a certain Xn coordinated transmission time interval (TTI). The target base station 102b may compare the timing of the Xn coordinated TTI relative to a desired timing for such a UE uplink signal and base the TA value on a difference between the two. The uplink signal may or may not be uplink timing alignment specific (chirp, SRS). The target base station 102b may measure the relative TA and forward the relative TA to the source base station 102a and to the UE 104 as described below.

For the target base station 102b uplink grant, n 4G, first the uplink grant from target base station 102b may be used for the handover UE 104 to send the RRC reconfiguration complete message to target base station 102b. The RRC reconfiguration complete message indicates to the target that the UE 104 has access to the target base station 102b and the UE 104 may start downlink and uplink packet scheduling.

A "target base station pre-allocated periodic uplink grant" may be used for a RACH-less solution. In certain cases, a RACH-less procedure for handovers may employ a target base station 102b uplink grant. The target base station 102b may use a pre-allocated periodic uplink grant. For example, the target base station 102b PUSCH may be pre-allocated to the UE 104 via a handover command as an semi-persistent scheduling (SPS)-like interval (e.g., an interval with the same periodicity, as well as having other similar attributes such as the particular resources used for the SPS with the indication of a sub-frame location. But a "target base station pre-allocated periodic uplink grant" solution requires a UE 104 capability enhancement to achieve a low or non-interruption handover, e.g., the UE 104 may need additional capability to support simultaneous intra-frequency target base station 102b PUSCH transmission and source base station 102a downlink PDCCH/PDSCH packet reception.

Some aspects described herein may include a downlink data coordination method which may have no additional UE capability requirement to achieve a lower or non-interruption handover. The downlink data coordination method may include a target base station 102b pre-allocation of an uplink/downlink resource to the UE 104 via a handover command. The handover command may have an SPS-like interval. In other words, the handover command may have, for example, the same periodicity as the SPS.

In the downlink data coordination method, the downlink data coordination procedure may be triggered. The downlink data coordination procedure may be triggered at the UE 104 based on receiving a UE physical layer ACK feedback, i.e., feedback from a network in response to the UE physical layer ACK. The UE physical layer ACK feedback may be in a target base station 102b downlink packet. The target base station 102b downlink packet may be transmitted from the base station 102b to the UE 104. The source radio access network (RAN) node may instruct the UE to direct uplink transmissions to the target base station 102b and/or direct downlink transmissions from the target base station 102b in a next pre-allocated Transmission Time Interval (TTI) on the pre-allocated resource. For example, the UE 104 may direct uplink transmissions to the target base station 102b. The UE may signal the network to direct downlink transmissions from the target base station 102b in a next pre-allocated TTI on the pre-allocated resource.

The UE 104 may access a target base station 102b directly for UP data transmission without the RACH procedure or the RRC reconfiguration complete message being sent to the target base station 102b. In an aspect, there may be no additional capability requirement for the UE 104 to support simultaneous or concurrent intra-frequency target base station 102b PUSCH transmission and source base station 102a downlink PDCCH/PDSCH packet reception.

Figure 9:
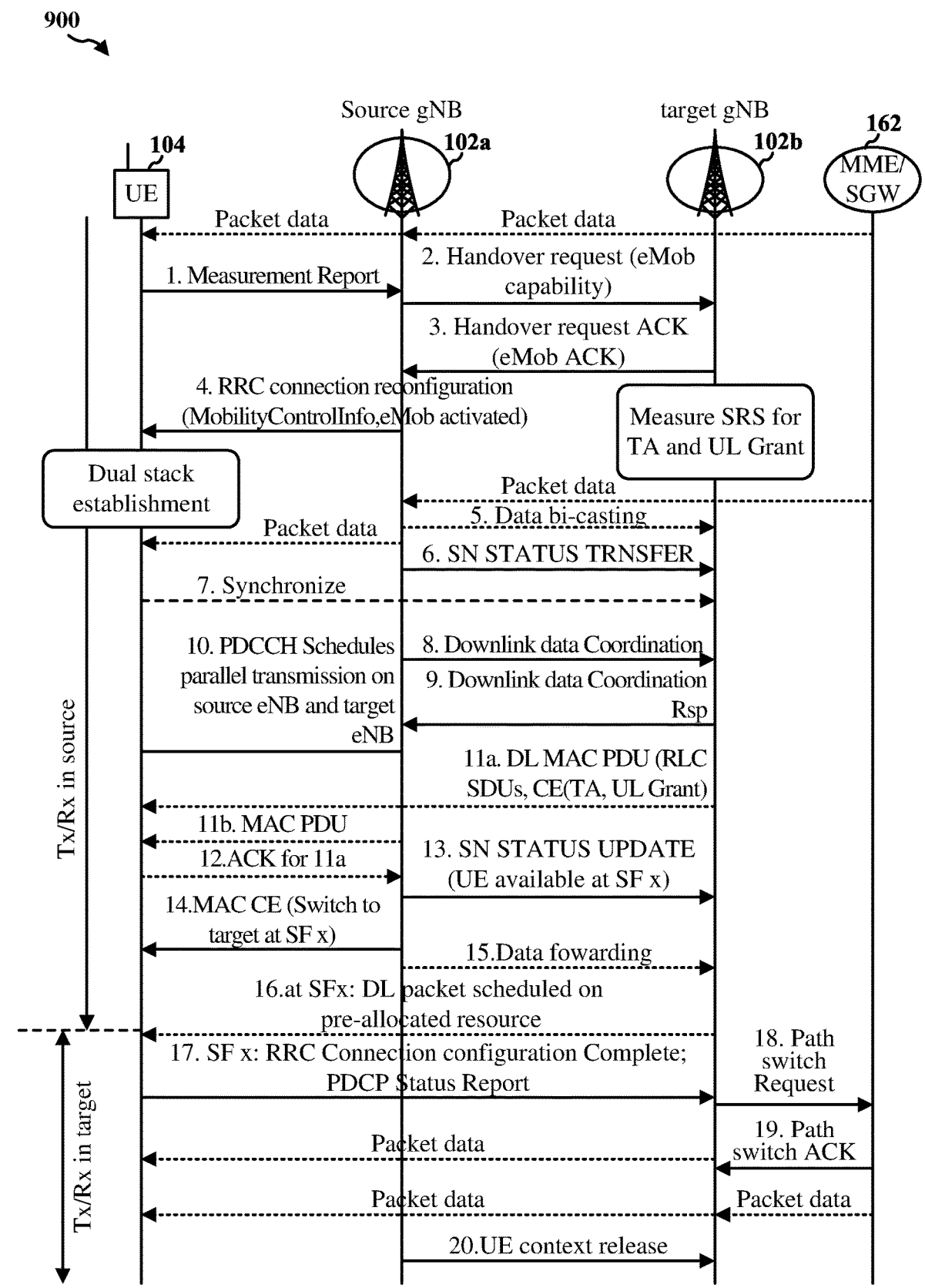
FIG. 9 is a diagram illustrating X2/Xn downlink data coordination.

FIG. 9 is a diagram 900 illustrating X2/Xn downlink data coordination. In 2-4, during handover preparation, as shown in FIG. 9, eMob capability may be negotiated between the UE 104 and the target base station 102b via the source base station 102a. The term "eMob" refers to the capability to support zero mobility handover functionality including dual stack (UE side) and the downlink data coordination procedure (UE side and network side). When the target base station 102b acknowledges support of the eMob feature, then the source base station 102a may send the RRC reconfiguration message with handoverControlIn (an indication that may be carried in the RRC reconfiguration message) for an indication of eMob activation that eMob has been activated.

In a handover execution stage 1 (e.g., during 5-7 of FIG. 9), when the UE 104 receives a handover command from the source base station 102a, the UE 104 may start to setup a dual protocol stack. The UE 104 may also reconfigure the UE's 104 layer 3 and layer 2 parameters, while continuing to receive downlink packets and transmit uplink packets via the source protocol stack. The target base station 102b may start to measure the UE's SRS in order to adjust the UE uplink time alignment and send the uplink grant. At 5, the source gNB 102a may start downlink PDCP data bi-casting, e.g., transmission of packets to multiple devices, e.g., to the target base station 102b and/or the UE 104 via Xn (copy downlink data to target) and Uu. At 7, the UE 104 may synchronize to the target base station 102b (e.g., a base station that is in a target cell). The UE 104 may simultaneously or concurrently receive from two intra-frequency cells (target cell: receive PSS/SSS/CRS and source base station 102a: receive PDCCH/PDSCH) and transmit to source base station 102a PUCCH/PUSCH.

In handover execution stage 2 (e.g., 8-12 of FIG. 9), at 8-9, there may be Xn downlink data coordination between the source base station 102a and the target base station 102b. The Xn may be useful for providing the downlink data coordination. However, Xn messages are not required because downlink data coordination is not required. Xn messages and downlink data coordination are not required because the latency requirement of Xn may not be very strict. For example, in some aspects, the Xn transmission latency may be more loose than carrier aggregation (CA).

At 10, the source base station 102a may schedule a downlink data transmission on both the source base station 102a and the target base station 102b using at least two codewords. The two codewords may contain the information needed to schedule a downlink data transmission on both the source base station 102a and the target base station 102b. At 11, the target base station 102b may send a downlink packet together with a measured TA and the pre-allocated uplink grant (e.g., may be a SPS like grant) in the MAC control element (CE) to the UE 104. At 12, if an ACK to the target gNB 102b transmission is received by the source base station 102a, the source base station 102a may know that the target base station 102b signal situation is suitable for direct access to the target base station 102b by the UE 104. If a NACK is received, e.g., from the UE 104, e.g., in response to the sent downlink packet, 10-12 may be repeated until the UE 104 can correctly receive downlink data from the target base station 102b, e.g., when the UE 104 receives data from the target base station 102b that may be verified as valid and correct data using data verification techniques such as check sums or other data detection or data correction methods.

In the Handover Execution Stage 3 (e.g., 13-20 of FIG. 9), for 13-14, the source base station 102a notifies the UE 104 to access the target base station 102b directly at target base station 102b pre-allocated subframe X. The pre-allocated subframe X may be a semi-persistent resource allocation which may be provided to the UE 104 in a handover command. The source base station 102a may also notify the target base station 102b via an X2/Xn message of the SN Status update for the last uplink packet and the SN the source base station 102a received. The source base station 102a may also notify the target base station 102b via an X2/Xn message of the pre-allocated subframe x at which the UE 104 may appear to the target.

At 16, at subframe x, the UE 104 may tune the UE's 104 receiver to the frequency of the target base station 102b to receive PDCCH, PDSCH from the target base station 102b. In an aspect, a notification from the source base station 102a to the target base station 102b about the subframe X when the UE 104 is available may not be sent. Rather, the target base station 102b may monitor the target base station 102b's semi pre-allocated uplink resource PUCCH to the UE. If the UE feedback is an ACK via the target base station 102b PUCCH, the target base station 102b may determine that the UE 104 is in the connected mode with the target base station 102b and that the UE 104 may be scheduled by the target base station 102b.

At 17, at a same subframe, e.g., subframe "x," the UE 104 may send an RRC configuration message and a PDCP status report to the target base station 102b (gNB, next generation eNB) 902. The target base station 102b may remove the received duplicated packets, e.g., from a stream of data the target base station 102 is receiving by comparing packets to already received packets and start to schedule the remaining packets to the UE. At 18-20, the path used to route packets to the UE 104 may switch from the source base station 102a to the target base station 102b. In other words, the UE 104 may begin using the target base station 102b as the base station 102 that the UE 104 is connected to.

Various aspects described herein may be used in combination to reduce user plane mobility interruption and may achieve a zero millisecond Mob or reduced user plane mobility interruption during handover. Aspects may use network bi-casting of downlink data to a source node and to a target node during handover message handling period. The time when packet bi-casting starts may vary depending on the implementation (e.g., target node buffer size, Xn backhaul reliability, UE capability, RACH-less access to the target base station 102b, as well as other considerations).

In some aspects, the uplink PDCP SN update procedure may, after a UE 104 starts to access target, update an uplink SN. The uplink SN may be reported from the source base station 102a to the target base station 102b via the Xn backhaul. In some aspects employing a downlink data coordination method, the target base station 102b may pre-allocate an uplink and/or downlink resource (e.g., time, frequency, and/or time/frequency resources) to a UE 104 via a handover command with mobility control information that may include an SPS-like interval (e.g., periodicity).

A source base station 102a may start a downlink data coordination when an ACK for the target base station transmission is received by the source base station 102a via the source base station 102a's PUCCH resources, e.g., the pre-[allocated resource referred to above. The source base station 102a may know that the target base station 102b signal situation is suitable for the UE 104 to access the target base station 102b directly. For example, that the target cell (base station 102b) signal strength at the UE 104 allows reliable reception at the UE 104, or that the UE 104 is in connected mode with the target base station 102b. The source base station 102a may order the UE 104 to directly access the target in a next pre-allocated transmission time interval (TTI) on the pre-allocated resource.

In an alternative solution a notification from the source base station 102a to the target base station 102b about the subframe X backhaul is not sent when the UE 104 is available, but instead may depend on the target base station 102b to monitor the target base station 102b's semi pre-allocated uplink resource PUCCH to the UE. For example, a UE 104 may receive from a target base station a semi pre-allocated uplink resource PUCCH, e.g., a pre-allocated UL PUCCH or a pre-allocated resource on a UL PUCCH. When the UE feedback ACK is received by the target base station 102b on the PUCCH, the target base station 102b may determine that the UE 104 is present in the target cell (e.g., is connected to the target base station 102b). The procedures described herein may allow the UE 104 to connect to the target base station 102b and bypass other connection procedures. Accordingly, the UE 104 may be scheduled by target base station 102b itself.

In an aspect, the UE 104 may access the target base station 102b directly for UL data transmission without performing a RACH procedure with the target base station 102b. Compared with other eMob solutions, the downlink data coordination may not require additional UE capability to support simultaneous intra-frequency target base station 102b PUSCH transmission and source base station 102a downlink PDCCH/PDSCH packet reception to achieve a lower or zero mobility interruption during handover.

Figure 10:
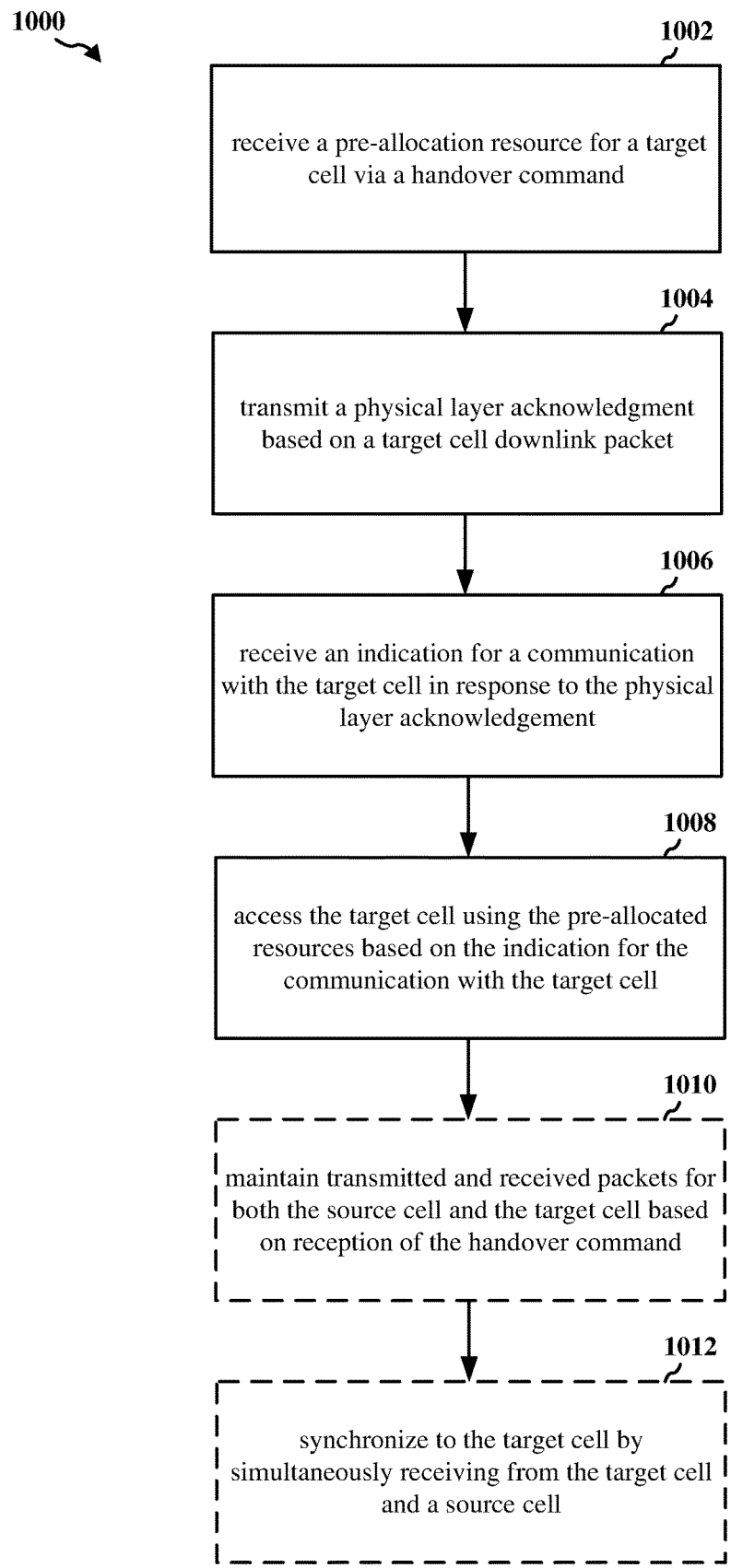
FIG. 10 is a flowchart of a method of wireless communication.

FIG. 10 is a flowchart 1000 of a method of wireless communication. The method may be performed by a UE (e.g., the UE 104). At 1002, the UE receives a pre-allocation resource for a target cell via a handover command. For example, the UE 104 may receive a pre-allocation resource for a target cell (e.g., from the target base station 102b) via a handover command.

At 1004, the UE transmits a physical layer acknowledgment based on a target cell downlink packet. For example, the UE 104 may transmit a physical layer acknowledgment based on a target cell downlink packet. The UE may receive the target cell downlink packet from a base station (e.g. target base station 102b) and send an acknowledgment, e.g., to the target base station 102b. In another example, a MAC layer acknowledgement may also be applied here. The acknowledgment, which may be based on a target cell downlink packet, may be sent on the frequency resources of the target cell, e.g., target base station 102b. [details— receive downlink packet(s) and send ACK to acknowledge the downlink packet(s)?]

At 1006, the UE receives an indication for a communication with the target cell in response to the physical layer acknowledgement. For example, the UE 104 may receive an indication for a communication with the target cell in response to the physical layer acknowledgement. For example, a network (e.g., a base station of the network) may send an indication for the communication with the target cell in response to the physical layer acknowledgment. The network may transmit signals that provide the indication for the communication with the target cell. In an aspect, the indication may be transmitted via level one (L1) signaling. In another aspect, the indication may be transmitted via level two (L2) using at least one of MAC, RLC, and/or PDCP extension header or control signaling command.

At 1008, the UE accesses the target cell using the pre-allocated resource, e.g., signaled in the indication, based on the indication for the communication with the target cell. For example, the UE 104 may access the target cell using the pre-allocated resource based on the indication for the communication with the target cell. The received indication may include data that indicates a pre-allocated resource. The pre-allocated resource may include some combination of time and frequency or time/frequency resources that are pre-assigned and enable the UE to establish communication with the target base station using the resource.

At 1010, the UE maintains, e.g., using a buffer or protocol stack, transmitted and received packets for both the source cell (e.g., source base station 102a) and the target cell based on reception of the handover command received in 1002. For example, buffers and/or a protocol stack may be setup in response to the handover command. The UE 104 may place entire packets into the buffer or protocol stack (or some subset of the data in the packets) that may be needed during the handover, until the handover is complete, or as needed after the handover is complete. For example, referring to FIG. 8, the UE 104 may maintain transmitted and received packets for both the source cell and the target cell based on reception of the handover command.

At 1012, the UE synchronizes to the target cell by simultaneously receiving from the target cell and a source cell. The simultaneously received signals that are received from the target cell and the source cell may provide an indication of the timing at each of the cells. Accordingly, timing between the two cells may be determined and the UE may synchronize based on the trimming differences and/or the timing information gained from the simultaneously received signals. For example, the UE 104 may synchronize to the target cell by simultaneously receiving from the target cell and a source cell.

Figure 11:
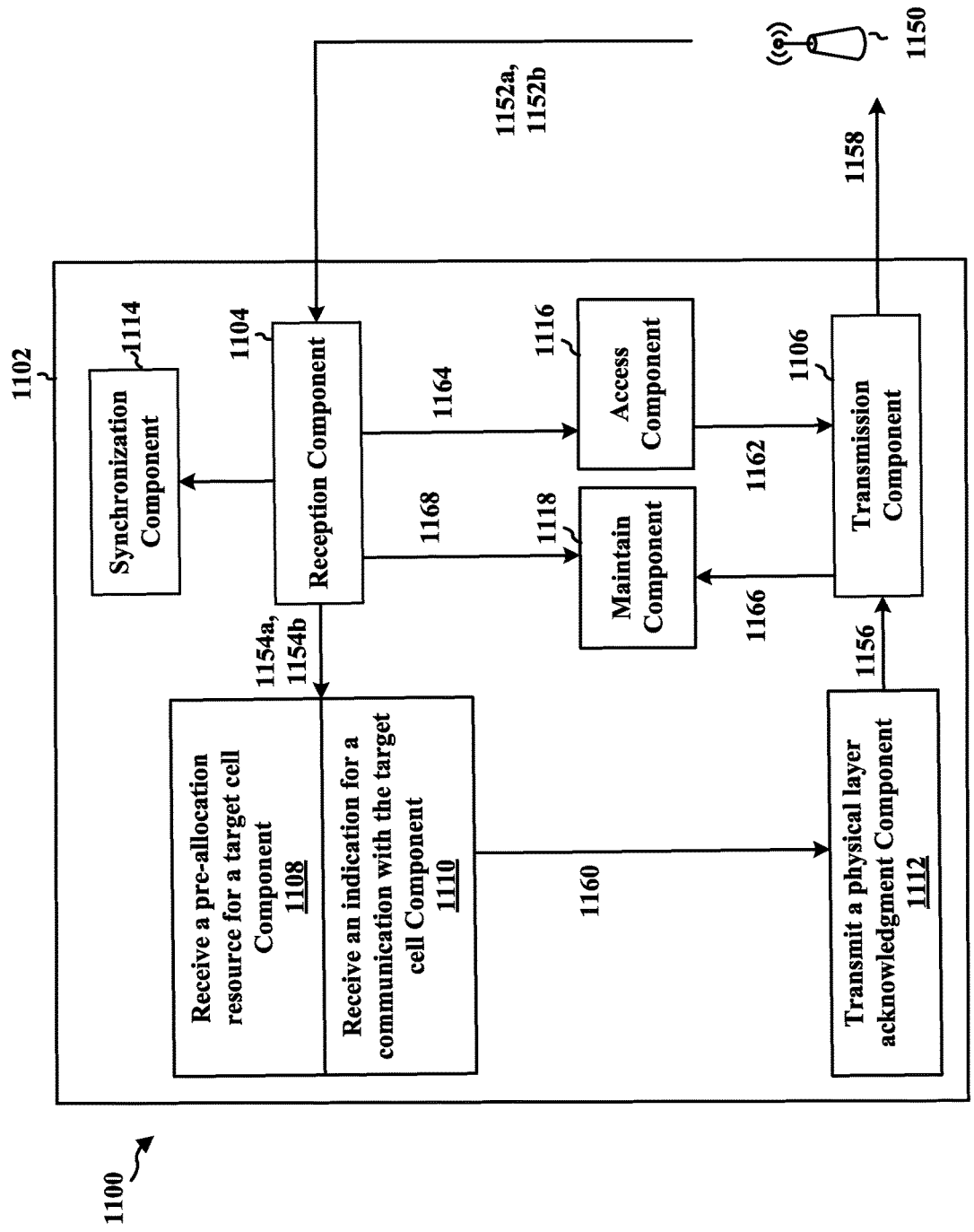
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a UE. The apparatus includes a reception component 1104 that receives a pre-allocation resource for a target cell via a handover command 1152a, e.g., from a base station 1150, and receives an indication 1152b for a communication with the target cell in response to the physical layer acknowledgement. The allocation resource via handover command 1154a, may be passed to the receive a pre-allocation resource for a target cell component 1108 (1154a). The indication 1152b may be passed to the receive an indication for a communication with the target cell component 1110 (1154b).

The apparatus includes a transmission component 1106 that may be controlled (1156) by the transmit a physical layer acknowledge component 1112 to transmit a physical layer acknowledgment 1158 based on a target cell downlink packet 1160, e.g., to base station 1150. The apparatus includes an accessing component 1108 that controls (1162) accesses the target cell using the pre-allocated resource based on the indication for the communication (1164) with the target cell. The apparatus includes a synchronization component 1114 that may synchronize the UE to the target cell as part of concurrently receiving from the target cell and a source cell and an access component 116 that may provide for accessing the target cell using the pre-allocated resource based on the indication for the communication with the target cell. The apparatus includes a maintain component 1118 that maintains, e.g., using a buffer of or protocol stack, transmitted packets (1166) and received packets (1168) for both the source cell (e.g., source base station 102a) and the target cell based on reception of the handover command.

The apparatus 1102 may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
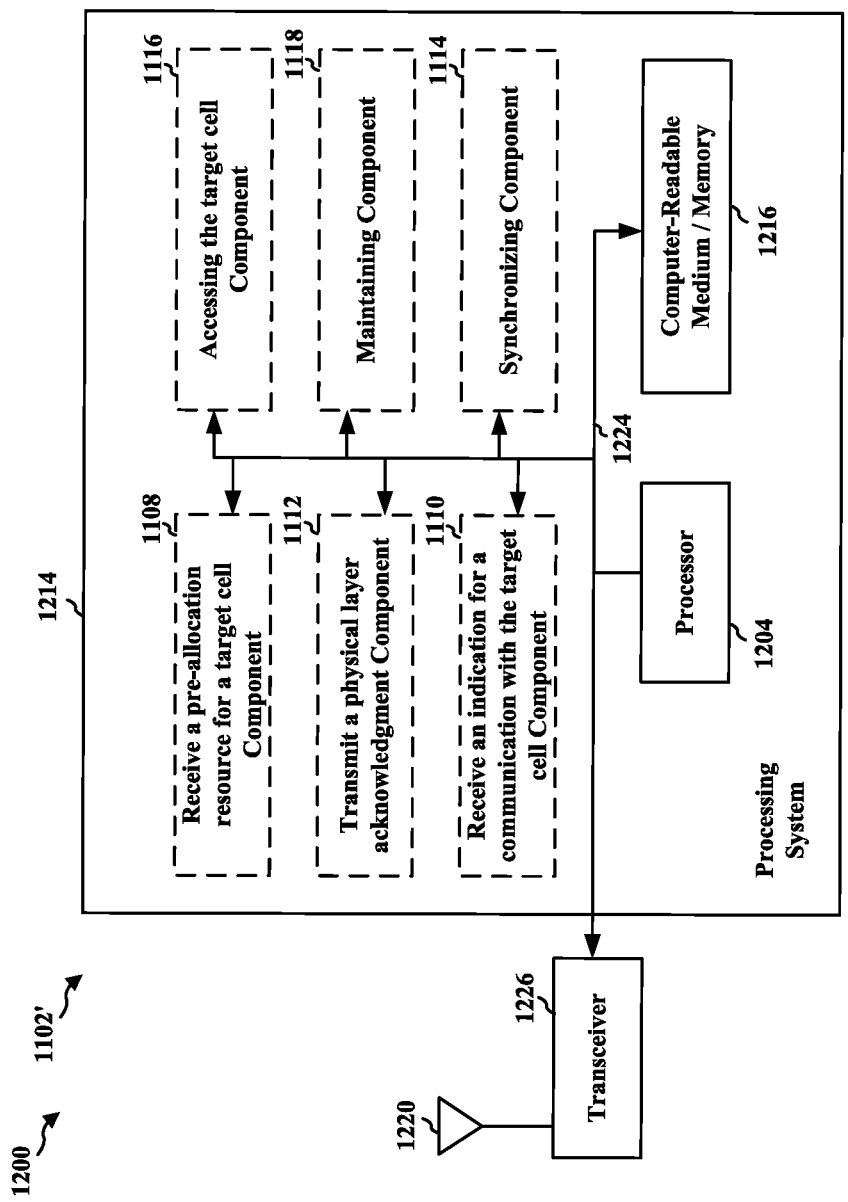
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1108, 1110, 1112, 1114, 1116, 1118 (and/or components 1104, 1104 of FIG. 11), and the computer-readable medium/memory 1216. The bus 1224 may also link various other circuits such as timing sources, peripherals, voltage regulators, and power management circuits, which are well known in the art, and therefore, will not be described any further.

The processing system 1214 may be coupled to a transceiver 1226. The transceiver 1226 is coupled to one or more antennas 1220. The transceiver 1226 provides a means for communicating with various other apparatus over a transmission medium. The transceiver 1226 receives a signal from the one or more antennas 1220, extracts information from the received signal, and provides the extracted information to the processing system 1214, specifically the reception component 1104 (not shown). In addition, the transceiver 1226 receives information from the processing system 1214, specifically the transmission component 1106 (not shown), and based on the received information, generates a signal to be applied to the one or more antennas 1220. The processing system 1214 includes a processor 1204 coupled to a computer-readable medium/memory 1216. The processor 1204 is responsible for general processing, including the execution of software stored on the computer-readable medium/memory 1216. The software, when executed by the processor 1204, causes the processing system 1214 to perform the various functions described supra for any particular apparatus. The computer-readable medium/memory 1216 may also be used for storing data that is manipulated by the processor 1204 when executing software. The processing system 1214 further includes at least one of the components 1104, 1106, 1108. The components may be software components running in the processor 1204, resident/stored in the computer readable medium/memory 1216, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102/1102' for wireless communication includes means for receiving a pre-allocation resource for a target cell via a handover command, means for transmitting a physical layer acknowledgment based on a target cell downlink packet (1108), means for receiving an indication for a communication with the target cell in response to the physical layer acknowledgement (1110), and means for accessing the target cell using the pre-allocated resource based on the indication for the communication with the target cell (1116). The means for accessing the target cell may select the pre-allocated resource and cause a communication with the target cell using the pre-allocated resource.

The apparatus 1102/1102' for wireless communication may also include means for maintaining transmitted and received packets for both a source cell and the target cell based on reception of the handover command (1118), means for synchronizing to the target cell by concurrently receiving from the target cell and a source cell (1114), means for causing a receiver to tune to receive a physical downlink control channel (PDCCH) from the target cell, and/or means for causing a receiver to tune to receive a physical downlink shared channel (PDSCH) from the target cell (1116). The means for maintaining transmitted and received packets for both a source cell and the target cell may receive packets and store packets to maintain the information in the packets. The means for synchronizing to the target cell by concurrently receiving from the target cell and a source cell may receive information and modify timing based on the received information. The means for causing a receiver to tune to receive a PDCCH may cause a receiver to be active and set a tuning of the receiver. The means for causing a receiver to tune to receive a PDSCH may also cause a receiver to be active and set a tuning of the receiver.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

In an aspect, an apparatus for wireless communication may include a memory and at least one processor coupled to the memory. The at least one processor may be configured to negotiate with a source node based on a user equipment (UE) eMob capability to start a low mobility interruption time handover, determine a UE uplink time alignment, determine a semi pre-allocated uplink resource, transmit downlink data according to a source cell coordination request, monitor a source cell semi pre-allocated uplink resource physical uplink control channel (PUCCH) allocated to the UE, and determine UE successfully access via physical layer acknowledgement.

In an aspect, the processor may be further configured to perform an SRA measurement. The semi pre-allocation uplink resource may be determined based on the SRA measurement.

In an aspect, the semi pre-allocation uplink resource may be determined the semi-pre-allocation resource for the UE via a handover command message.

In an aspect, the low interruption handover comprises a zero interruption handover. It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:
a memory; and
at least one processor coupled to the memory, the at least one processor configured to:
receive a pre-allocation resource for a target cell via a handover command;
transmit a physical layer acknowledgment based on a target cell downlink packet;
receive an indication for a communication with the target cell in response to the physical layer acknowledgement; and
access the target cell using the pre-allocation resource based on the indication for the communication with the target cell.

2. The apparatus of claim 1, wherein the at least one processor is further configured to maintain transmitted and received packets for both a source cell and the target cell based on reception of the handover command.

3. The apparatus of claim 1, wherein the at least one processor is further configured to synchronize to the target cell by concurrently receiving from the target cell and a source cell.

4. The apparatus of claim 1, wherein the pre-allocation resource includes information to access the target cell directly at a target cell pre-allocated subframe.

5. The apparatus of claim 1, wherein the apparatus further comprises a receiver and the processor is further configured to cause the receiver to tune to a frequency of the target cell to receive a physical downlink control channel (PDCCH) from the target cell.

6. The apparatus of claim 1, wherein the apparatus further comprises a receiver and the processor is further configured to cause the receiver to tune to a frequency of the target cell to receive a physical downlink shared channel (PDSCH) from the target cell.

7. The apparatus of claim 1, wherein the pre-allocation resource includes information for at least one of transmitting a radio resource control (RRC) configuration message to a target evolved Node B (eNB) in the target cell or transmitting a packet data convergence protocol (PDCP) status report to a target eNB in the target cell.

8. The apparatus of claim 1, wherein the at least one processor is further configured to receive from a target evolved Node B (eNB) a semi pre-allocated uplink resource physical uplink control channel (PUCCH).

9. A method for wireless communication, comprising:
receiving a pre-allocation resource for a target cell via a handover command;
transmitting a physical layer acknowledgment based on a target cell downlink packet;
receiving an indication for a communication with the target cell in response to the physical layer acknowledgement; and
accessing the target cell using the pre-allocated resource based on the indication for the communication with the target cell.

10. The method of claim 9, further comprising maintaining transmitted and received packets for both a source cell and the target cell based on reception of the handover command.

11. The method of claim 9, further comprising synchronizing to the target cell by concurrently receiving from the target cell and a source cell.

12. The method of claim 9, wherein the pre-allocation resource includes information for accessing the target cell directly at a target cell pre-allocated subframe.

13. The method of claim 9, further comprising receiving a physical downlink control channel (PDCCH) from the target cell.

14. The method of claim 9, further comprising receiving a physical downlink shared channel (PDSCH) from the target cell.

15. The method of claim 9, wherein the pre-allocation resource includes information for transmitting at least one of a radio resource control (RRC) configuration message to a target evolved Node B (eNB) in the target cell or a packet data convergence protocol (PDCP) status report to a target eNB in the target cell.

16. The method of claim 9, further comprising receiving from a target evolved Node B (eNB) a semi pre-allocated uplink resource physical uplink control channel (PUCCH).

17. An apparatus for wireless communication, comprising:
means for receiving a pre-allocation resource for a target cell via a handover command;
means for transmitting a physical layer acknowledgment based on a target cell downlink packet;
means for receiving an indication for a communication with the target cell in response to the physical layer acknowledgement; and
means for accessing the target cell using the pre-allocated resource based on the indication for the communication with the target cell.

18. The apparatus of claim 17, further comprising means for maintaining transmitted and received packets for both a source cell and the target cell based on reception of the handover command.

19. The apparatus of claim 17, further comprising means for synchronizing to the target cell by concurrently receiving from the target cell and a source cell.

20. The apparatus of claim 17, wherein the pre-allocation resource includes information for the apparatus to access the target cell directly at a target cell pre-allocated subframe.

21. The apparatus of claim 17, further comprising means for causing a receiver to tune to receive a physical downlink control channel (PDCCH) from the target cell.

22. The apparatus of claim 17, further comprising means for causing a receiver to tune to receive a physical downlink shared channel (PDSCH) from the target cell.

23. The apparatus of claim 17, wherein the pre-allocation resource includes information for transmitting at least one of s radio resource control (RRC) configuration message to a target evolved Node B (eNB) in the target cell or a packet data convergence protocol (PDCP) status report to a target eNB in the target cell.

24. The apparatus of claim 17, further comprising means for receiving from a target evolved Node B (eNB) a semi pre-allocated uplink resource physical uplink control channel (PUCCH).

25. A non-transitory, computer-readable medium storing computer executable code for wireless communication, the code when executed by a processor, to cause the processor to:
receive a pre-allocation resource for a target cell via a handover command;
transmit a physical layer acknowledgment based on a target cell downlink packet;
receive an indication for a communication with the target cell in response to the physical layer acknowledgement; and access the target cell using the pre-allocated resource based on the indication for the communication with the target cell.

26. The non-transitory, computer executable code of claim 25, comprising code, when executed by the processor, to further cause the processor to maintain transmitted and received packets for both a source cell and the target cell based on reception of the handover command.

27. The non-transitory, computer executable code of claim 25, comprising code, when executed by the processor, to further cause the processor to synchronize to the target cell by concurrently receiving from the target cell and a source cell.

28. The non-transitory, computer executable code of claim 25, wherein the pre-allocation resource includes information to access the target cell directly at a target cell pre-allocated subframe.

29. The non-transitory, computer executable code of claim 25, further comprising code, when executed by the processor, to further cause the processor to cause a receiver to tune to a frequency of the target cell to receive a physical downlink control channel (PDCCH) from the target cell.

30. The non-transitory, computer executable code of claim 25, further comprising code, when executed by the processor, to further cause the processor to cause a receiver and the processor is further configured to cause the receiver to tune to a frequency of the target cell to receive a physical downlink shared channel (PDSCH) from the target cell.

* * * * *